(12) United States Patent  
Tanaka et al.

(10) Patent No.: US 7,219,544 B2  
(45) Date of Patent: May 22, 2007

(54) THERMAL-TYPE FLOW RATE SENSOR AND MANUFACTURING METHOD THEREOF

(75) Inventors: Masaaki Tanaka, Kariya (JP); Tiaki Mizuno, Toyota (JP); Hiromi Ariyoshi, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/178,306

(22) Filed: Jul. 12, 2005

(65) Prior Publication Data  
US 2006/0075815 A1 Apr. 13, 2006

(30) Foreign Application Priority Data  
Sep. 24, 2004 (JP) ............................. 2004-277794

(51) Int. Cl.  
*G01F 1/68* (2006.01)

(52) U.S. Cl. .................................. 73/204.26

(58) Field of Classification Search ............. 73/204.22, 73/204.26  
See application file for complete search history.

(56) References Cited

U.S. PATENT DOCUMENTS 5,396,795 A * 3/1995 Araki ....................... 73/204.26

6,708,560 B2 * 3/2004 Watanabe et al. ........ 73/204.22

FOREIGN PATENT DOCUMENTS

JP   B2-3228547   1/1999

OTHER PUBLICATIONS

Notice of Preliminary Rejection from Korean Patent Office issued on Sep. 29, 2006 for the corresponding Korean patent application No. 10-2005-0067491 (a copy and English translation thereof).

* cited by examiner

*Primary Examiner*—Harshad Patel  
(74) *Attorney, Agent, or Firm*—Posz Law Group, PLC

(57) ABSTRACT

In a thermal-type flow rate sensor, a mold material is formed to integrally cover a predetermined range including a circuit chip, connecting parts of connecting wires with a flow rate detecting chip and the circuit chip, and connecting parts of connecting wires with the circuit chip and a lead portion, to expose a part of the flow rate detecting chip to a measured fluid. The flow rate detecting chip is located in a groove portion of a support member to have a clearance with the groove portion and to form a cavity part inside a thin wall portion of the detecting chip. The cavity part communicates with an outside through a communicating portion that includes the clearance, and the clearance is blocked by a filler at least at a portion positioned in the predetermined range. Therefore, the filler prevents the mold material from entering the clearance in the mold forming.

12 Claims, 4 Drawing Sheets

THERMAL-TYPE FLOW RATE SENSOR AND MANUFACTURING METHOD THEREOF

CROSS REFERENCE TO RELATED APPLICATION

This application is based on Japanese Patent Application No. 2004-277794 filed on Sep. 24, 2004, the contents of which are incorporated herein by reference in its entirety.

FIELD OF THE INVENTION

The present invention relates to a thermal-type flow rate sensor and a method for manufacturing the thermal-type flow rate sensor.

BACKGROUND OF THE INVENTION

For example, a thermal-type flow rate sensor described in JP-B2-3328547 detects a flow rate of a fluid by utilizing the fact that heat caused by a heater is robbed by the fluid passing the vicinity of the heater.

The thermal-type flow rate sensor in JP-B2-3328547 includes a flow rate detecting chip, a circuit chip, leads and a support member. The flow rate detecting chip has a flow rate detecting portion including a heater (heat generating resistor) formed in a thin wall portion of a semiconductor substrate. The circuit chip has a circuit portion electrically connected to the flow rate detecting portion through connecting wires and processes an output signal of the flow rate detecting portion. The leads are electrically connected to the circuit portion through the connecting wires, and the support member is provided for mounting at least the flow rate detecting chip.

In a mounting state of the flow rate detecting chip onto the support member, a predetermined range including each connecting part of the connecting wires and the flow rate detecting portion and the circuit portion, each connecting part of the connecting wires and the circuit portion and the leads, and the circuit chip is integrally covered with a mold material, so as to expose one portion of the flow rate detecting portion including the heater to a measured fluid (e.g., air).

The support member has one end surface and two side surfaces which are bent in a perpendicular direction from a bottom surface portion where the flow rate detecting chip is arranged. The flow rate detecting chip is positioned by the one end surface and both side surfaces, and is arranged on the support member so as to close a cavity part of the lower portion of a thin film portion of a substrate of the flow rate detecting chip. Therefore, the cavity part of the lower portion of the thin wall portion of the flow rate detecting chip is blocked by the support member, and is not directly exposed to the measured fluid.

Accordingly, when a circumferential portion of the cavity part is fixed (e.g., adhered) to the support member so as to surround the cavity part of the substrate, it is difficult for the temperature of the fluid (air) sealed in the cavity part to follow a temperature change around the thermal-type flow rate sensor, and a measuring error is generated.

Further, if the flow rate detecting chip is partially fixed to the support member, the cavity part can communicate with the exterior through the clearance between the flow rate detecting chip and the support member. However, there is a predetermined clearance between each of the side surfaces (and one end surface) of the support member positioning the flow rate detecting chip, and the side surface of the flow rate detecting chip. Therefore, the mold material enters this clearance during the integral molding. In this case, the mold material may enter into the cavity part in accordance with the difference of an arrangement of the flow rate detecting chip, and the difference of formation of both the side surfaces (and one end surface) of the support member. Accordingly, the cavity part is blocked by this mold material, and the measuring error is generated.

SUMMARY OF THE INVENTION

In view of the above-described problems, it is an object of the present invention to provide a thermal-type flow rate sensor and its manufacturing method, which can reduce noises caused by a turbulent flow and reduce a measuring error.

According to an aspect of the present invention, a thermal-type flow rate sensor includes: a flow rate detecting chip that includes a substrate having a thin wall portion, and a flow rate detecting portion having a heater located in the thin wall portion; a circuit chip electrically connected to the flow rate detecting portion through a first connecting wire and having a circuit portion for controlling input and output of the flow rate detecting portion; a lead portion electrically connected to the circuit portion through a second connecting wire; a support member having a groove portion in which the flow rate detecting chip is attached; and a mold material. The mold material is formed through a mold forming, to integrally cover a predetermined range including the circuit chip, connecting parts of the first connecting wire with the flow rate detecting portion and the circuit portion, and connecting parts of the second connecting wire with the circuit portion and the lead portion, so as to expose a part of the flow rate detecting portion including the heater to a measured fluid. The flow rate detecting chip is located in the groove portion of the support member to have a clearance with the groove portion and to form a cavity part inside the thin wall portion, and the cavity part communicates with an outside of the thin wall portion through a communicating portion that includes the clearance. Furthermore, the clearance is blocked by a filler material at least at a portion positioned in the predetermined range, and the filler material prevents the mold material from entering the clearance in the mold forming.

Accordingly, the cavity part of the flow rate detecting chip positioned and arranged in the groove portion of the support member is not directly exposed to the measured fluid. Therefore, noises due to a turbulent flow can be reduced in comparison with a structure in which no support member is arranged. In addition, the cavity part inside the thin wall portion of the substrate is not completely blocked by the support member and communicates with the exterior of the flow rate detecting chip through the communicating portion formed in the support member. However, in this invention, the clearance is blocked by the filler material at least at a portion positioned in the predetermined range, and the filler material prevents the mold material from entering the clearance in the mold forming. Accordingly, it can prevent the mold material from entering to the cavity part and the cavity part from being blocked.

When the flow rate detecting chip arranged in the groove portion has a surface that is positioned approximately on the same surface as a surface of the support member, noises caused by a turbulent flow of the fluid (air) can be further reduced. For example, the filler material is an adhesive. In this case, the flow rate detecting chip can be tightly fixed to the support member.

Further, the support member and the lead portion can be made of the same material. In this case, the structure of the flow rate sensor can be made simple. Furthermore, a semiconductor substrate can be used as the substrate.

The communicating portion further includes a communication groove that is provided in the support member to communicate with the clearance. Furthermore, the communication groove can be made to communicate with the clearance between a side wall of the flow rate detecting chip and the groove portion opposite to the side wall. Therefore, it can prevent a large amount of the measured fluid such as air from entering to the cavity part, and noise due to the flow of the measured fluid can be effectively reduced. Furthermore, a part of the groove portion can be used as a staying portion in which the filler material is provided.

The support member can be constructed with a first support portion having a through hole in which the flow rate detecting chip is arranged, and a second support portion for supporting the first support portion. In this case, the second support portion has a communication groove used as the communicating portion, and the communication groove communicates with a clearance between an outer side surface of the first support portion and a side surface of the second support portion, opposite to the outer side surface of the first support portion.

According to another aspect of the present invention, a method of manufacturing a thermal-type flow rate sensor includes: arranging a flow rate detecting chip in a groove portion of a support member to form a clearance with the groove portion, wherein the flow rate detecting chip includes a substrate having a thin wall portion, and a flow rate detecting portion having a heater located in a cavity part inside the thin wall portion; electrically connecting the flow rate detecting chip with a circuit chip and a lead portion using connecting wires; injecting a filler material into the clearance to block at least a part of the clearance; and integrally molding a mold material to integrally cover a predetermined range including the circuit chip and connection parts of the connecting wires, to expose a part of the flow rate detecting portion including the heater to a measured fluid. Furthermore, the clearance is blocked at least in an area positioned within the predetermined range such that the mold material is prevented to entering the clearance in the integrally molding. Therefore, the method can prevent the mold material from entering to the cavity part inside the thin wall portion.

The electrically connecting can be performed before the arranging or can be performed after the arranging.

Furthermore, the support member can be formed by arranging a first support portion having a through hole to a second support portion so as to form the groove portion using the through hole and a surface of the second support portion. In this case, the first support portion can be mounted to the second support portion after the flow rate detecting chip is fixed to the first support portion. For example, the flow rate detecting chip can be fixed to the first support portion using the filler material.

BRIEF DESCRIPTION OF THE DRAWINGS

The above and other objects, features and advantages of the present invention will become more apparent from the following detailed description of preferred embodiments made with reference to the accompanying drawings, in which.

DETAILED DESCRIPTION OF PREFERRED EMBODIMENTS (First Embodiment)

Figure 1A:
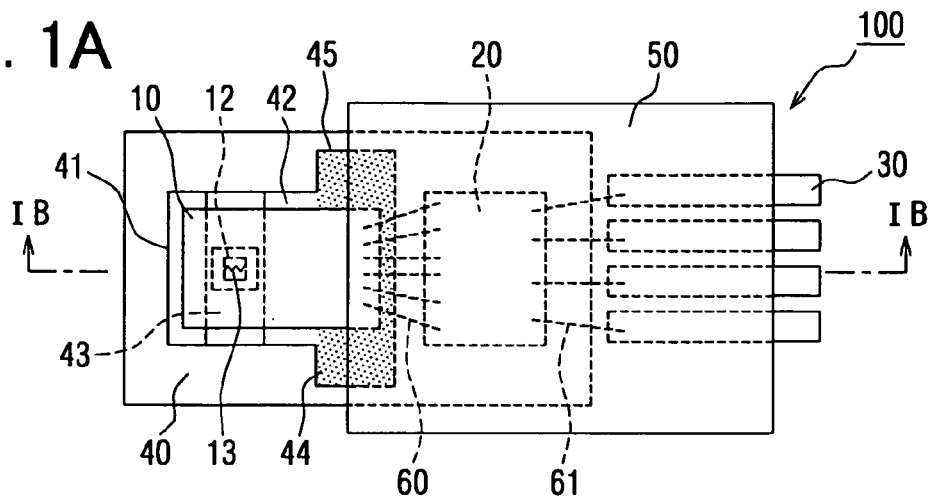
FIG. 1A is a schematic plan view showing a thermal-type flow rate sensor according to a first preferred embodiment of the present invention.
Figure 1B:
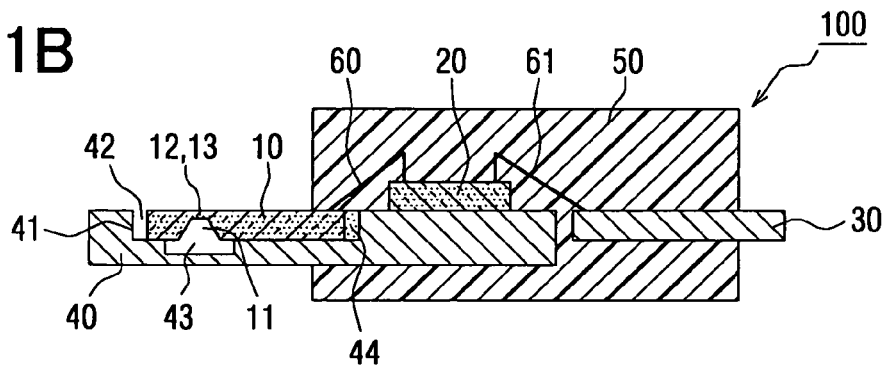
FIG. 1B is a cross-sectional view taken along line IB—IB in FIG. 1A.

As shown in FIGS. 1A and 1B, a thermal-type flow rate sensor 100 in this embodiment is constructed with a flow rate detecting chip 10 partially exposed to a measured fluid (e.g., air, in this embodiment) and detecting its flow rate, a circuit chip 20 for controlling the input and output of the flow rate detecting chip 10, leads 30 electrically connected to the circuit chip 20 and connected to the exterior, a support member 40 for mounting at least the flow rate detecting chip 10, and a mold material 50. The mold material 50 is molded using a resin material, for example, for integrally covering a part of the flow rate detecting chip 10, the circuit chip 20 and a part of the leads 30. In FIGS. 1A and 1B, reference numerals 60 and 61 respectively designate bonding wires for electrically connecting the flow rate detecting chip 10 and the circuit chip 20, and bonding wires for electrically connecting the circuit chip 20 and the leads 30.

For example, the flow rate detecting chip 10 is constructed with a silicon semiconductor substrate. A flow rate detecting portion of the flow rate detecting chip 10 has a thin wall portion (membrane) 12 constructed from a thin insulating film formed on a cavity portion 11. The thin wall portion 12 is formed by etching the semiconductor substrate and by forming the cavity portion 11. As shown in FIG. 1B, the cavity portion 11 is formed inside the thin wall portion 12. A heater 13 is arranged in the thin wall portion 12. When the silicon semiconductor substrate is used as a substrate of the flow rate detecting chip 10, the thin wall portion 12 can be simply formed by performing the etching from the rear surface side of the thin wall portion 12. In this case, the heater 13 can function as the flow rate detecting portion having a high sensitivity as described later. Accordingly, in the thermal-type flow rate sensor 100, the flow rate detecting chip 10 can be made in compact while having a high sensitivity, and can be manufactured at a low cost.

Figure 2:
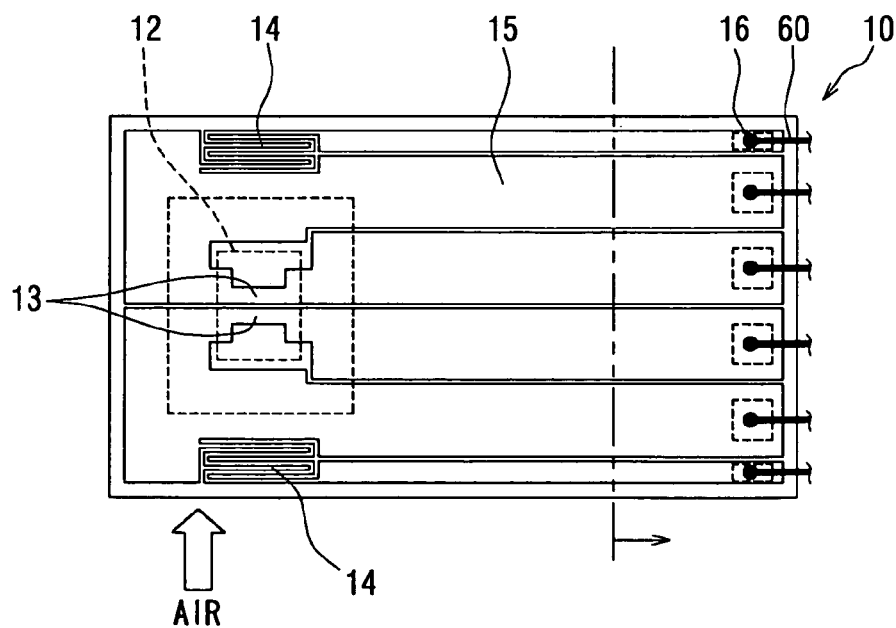
FIG. 2 is a plan view showing a flow rate detecting chip of the thermal-type flow rate sensor in FIG. 1A.

The flow rate detecting chip 10 will be described in more detail with reference to FIG. 2. FIG. 2 is a plan view showing the structure of the flow rate detecting chip 10. In FIG. 2, for convenience, the flow rate detecting chip 10 is illustrated by omitting the mold material 50. That is, the right-hand side from the two-dotted chain line shows a portion covered with the mold material 50.

Because the thin wall portion 12 is very thinly formed in comparison with other part in the substrate, the heat capacity of the thin wall portion 12 is lowly restrained and thermal insulation with respect to the substrate is secured in the thin wall portion 12. As shown in FIG. 2, a pair of heaters 13 constructed with a heat generating resistor are formed on the upstream side and the downstream side of an air flow in the thin wall portion 12. A pair of temperature sensing portions 14 constructed with a temperature measuring resistor are formed on the substrate around the thin wall portion 12 on the upstream side and the downstream side of the heater 13 in the air flow.

Each heater 13 has a function for sensing its own temperature on the basis of a change of its own resistance temperature coefficient in addition to the function as a heat generating resistor for generating heat by the supply amount of an electric current. The flow rate of air is detected on the basis of heat robbed by the circulating air among the heat generated from each of the upstream and downstream heaters 13. That is, the flow rate of air is detected based on the heat transmitted to the air, among the heat generated from each of the heaters 13. Further, the electric current amount supplied to each heater 13 is controlled on the basis of a temperature difference between the upstream heater 13 and the upstream temperature sensing portion 14, and a temperature difference between the downstream heater 13 and the downstream temperature sensing portion 14.

In FIG. 2, reference numeral 15 designates a wiring portion, and reference numeral 16 designates an electrode pad portion arranged at an end portion of the wiring portion 15. The flow rate detecting portion of the flow rate detecting chip 10 and a circuit portion of the circuit chip 20 are electrically connected through the bonding wire 60 connected to the pad portions 16. In this embodiment, the flow rate detecting portion is constructed with the heaters 13 formed in the thin wall portions 12, the temperature sensing portions 14, and the wiring portions 15. As shown in FIG. 2, a part of the wiring portions 15 and the pad portions 16 are covered with the mold material 50 (the right-hand side area from the two-dotted chain line in FIG. 2).

The support member 40 is for arranging at least the flow rate detecting chip 10, and is formed by processing (etching, etc.) the same material as the leads 30 in this embodiment. When the support member 40 is formed from the same material as the leads 30, the structure of the thermal-type flow rate sensor 100 can be simplified. Further, because the flow rate detecting chip 10 is mounted onto the support member 40, the cavity portion 11 of the flow rate detecting chip 10 is not directly exposed to the air as a measured fluid. Accordingly, noises caused due to a turbulent flow of the measured fluid can be reduced in comparison with a structure in which no support member is arranged in the lower portion of the cavity portion 11.

For example, as shown in FIGS. 1A and 1B, a groove portion 41 approximately having the same size as the outer shape of the flow rate detecting chip 10 is formed at one end side of the support member 40 by performing e.g., half etching. The flow rate detecting chip 10 is arranged within this groove portion 41. As an example, the flow rate detecting chip 10 is bonded and fixed to the bottom surface of the groove portion 41 using an adhesive by setting the rear surface of the flow rate detecting portion to a lower surface. In this arranging state, the forming surface of the flow rate detecting portion of the flow rate detecting chip 10 is positioned approximately on the same plane as the surface of the support member 40. Accordingly, the influence of a turbulent flow generated by the step difference between the flow rate detecting chip 10 and the support member 40 can be prevented. Further, the generation of a burr is restrained during an integral molding operating using the mold material 50 described later. In this embodiment, the circuit chip 20 having the unillustrated circuit portion for controlling the input and output of the flow rate detecting portion is bonded and fixed to the support member 40 by using an adhesive, at the other end portion of the support member 40. As shown in FIG. 2, the rear surface of the circuit portion forming surface is bonded to the support member 40.

Further, in a state in which the flow rate detecting chip 10 is arranged in the groove portion 41, a communicating portion for communicating the cavity portion 11 and the exterior on the flow rate detecting chip 10 is formed in the support member 40. That is, the cavity portion 11 of the flow rate detecting chip 10 is not completely blocked by the support member 40, but is communicated with the exterior (i.e., the air as a measured fluid) on the flow rate detecting chip 10 through the communicating portion. Accordingly, the temperature of the fluid in the cavity portion 11 can be changed by following a temperature change around the flow rate detecting chip 10. Accordingly, a measuring error due to the temperature change of air can be reduced in comparison with a structure for completely sealing the cavity portion 11 by the support member 40.

As shown in FIGS. 1A and 1B, the groove portion 41 is formed to form a predetermined clearance with respect to the flow rate detecting chip 10. When the flow rate detecting chip 10 is positioned and arranged within the groove portion 41, the predetermined clearance 42 is formed between the side surface of the groove portion 41 and the side surface of the opposed flow rate detecting chip 10. In this embodiment, a communicating groove portion 43 communicated with the clearance 42 is formed in the lower portion of the cavity portion 11 by half etching. Therefore, the communicating portion is constructed with this communicating groove portion 43 and the clearance 42. When the communicating portion is constructed with the communicating groove portion 43 and the clearance 42 in this way, the structure of the communicating portion can be simplified. Further, because the air (the measured fluid) can enter the cavity portion 11 from the exterior on the flow rate detecting chip 10 through the clearance 42 and the communicating groove portion 43, a large amount of the air does not flow into the cavity portion 11 and noises due to the turbulent flow of the air can be effectively reduced.

The communicating portion may be provided at only one place with respect to the cavity portion 11, and may be also provided at plural places. The arranging place of the communicating portion may be determined together with the shape, the size, etc. in consideration of easiness of generation of the turbulent flow in the cavity portion 11, and the following property with respect to the circumferential temperature change. In this embodiment, the communicating groove portion 43 is formed along a flow direction of the air, and the communicating portion is formed at two places with respect to the flow rate detecting chip 10.

A filler 44 is injected at least at a position for preventing the mold material 50 from entering into the clearance 42 in the integral molding. That is, at least a part of the clearance 42 is blocked by using the filler 44 so as to prevent the mold material 50 from entering into the clearance 42 in the integral molding. Thus, even when the cavity portion 11 of the flow rate detecting chip 10 is not completely blocked by the support member 40 and is constructed to be commmunicated with the extexior on the forming surface of the flow rate detecting chip 10 through the communicating portion, the mold material 50 is prevented from entering into the cavity portion 11 during the integral molding because the cavity portion 11 is blocked.

Any material can be used as the filler 44 if this material can be injected into the clearance 42 between the side surface of the groove portion 41 and the side surface of the flow rate detecting chip 10, and is hardened after the injection and can restrain the invasion of the mold material 50 into the clearance 42. For example, gel (silicon gel, fluorine gel, etc.), thermoplastic resin, an adhesive, etc. can be used. When the adhesive is particularly applied, the flow rate detecting chip 10 can be tightly fixed to the support member 40. In this embodiment, an epoxy adhesive is typically used as the filler 44.

An injecting position of the filler 44 into the clearance 42 can be set only at a position for preventing the entering of the mold material 50 during the integral molding of a resin material. The mold material 50 is arranged to protect the circuit portion formed in the circuit chip 20, the bonding wires 60, 61, and the connecting parts with the bonding wires 60, 61. Through the connection parts with the bonding wires 60, 61, the flow rate detecting chip 10, the circuit chip 20 and the leads 30 are electrically connected. Because a predetermined area of the flow rate detecting chip 10 including the pad portions 16 is covered with the mold material 50, it is preferable to inject the filler 44 into the clearance 42 within the covered area of the mold material 50, and the clearance 42 in a predetermined range from the boundary with respect to the covered area. Here, the clearance 42 is blocked by the filler 44 before the integral molding is performed, such that no mold material 50 enters the clearance 42 in the integral molding.

In this embodiment, as shown in FIG. 1A, a staying portion 45 in which the filler 44 stays is formed by enlarging the groove portion 41 in a planar direction. The staying portion 45 is arranged from the area covered with the mold material 50 to an uncovered area as shown in FIG. 1A. Therefore, an entering of the mold material 50 into the clearance 42 in the integral molding is prevented by injecting the filler 44 into this staying portion 45. Thus, when the staying portion 45 for staying the filler 44 in a part of the groove portion 41 is formed, the filler 44 can be set to stay in a predetermined position (i.e., the staying portion 45) of the clearance 42 even when the filler 44 having a good fluidity (low viscosity) is used at the injecting time. In FIG. 1A, the staying portion 45 is structured so that the filler 44 stays in the planar direction of the clearance 42. However, the staying portion 45 can be structured to extend in a depth direction without changing the width of the clearance 42.

The mold material 50 is made of an electric insulating material such as epoxy resin, etc. able to be integrally molded, and the flow rate detecting chip 10 is arranged in the groove portion 41 of the support member 40. The cavity portion 11 is communicated with the exterior on the front surface of the flow rate detecting chip 10 through the communicating portion. After the filler 44 is injected in a predetermined range of the clearance 42 between the flow rate detecting chip 10 and the groove portion 41 of the support member 40, the circuit chip 20 having the circuit portion therein, the respective bonding wires 60, 61, and the connecting parts of the respective bonding wires 60, 61 connected with the respective parts (the flow rate detecting chip 10, the circuit chip 20 and the leads 30) are integrally covered with the mold material 50.

Figure 3A:
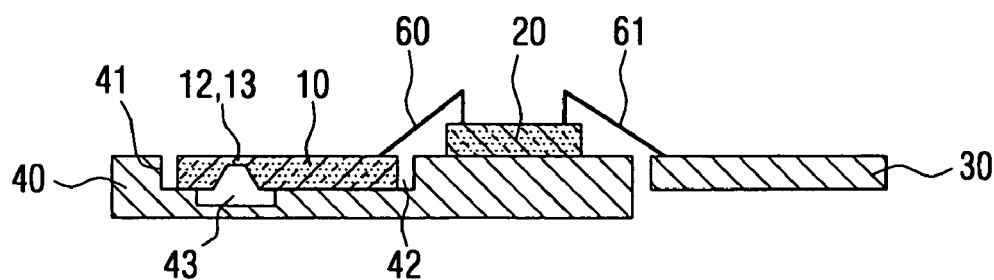
FIGS. 3A to 3C are schematic sectional views showing an electrical connecting process, a filler injection process and a resin molding process, respectively, in a manufacturing method of a thermal-type flow rate sensor according to the first embodiment.
Figure 3B:
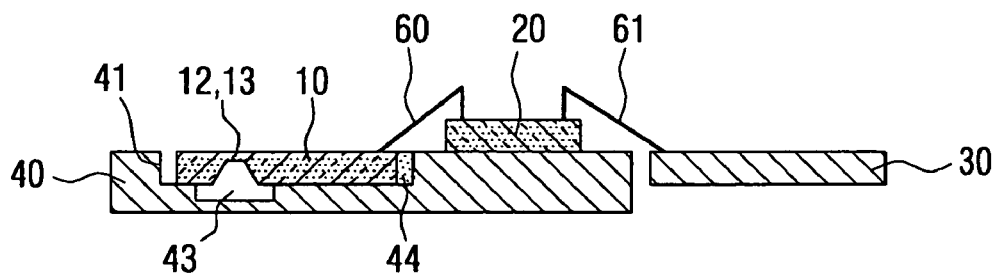
Figure 3C:
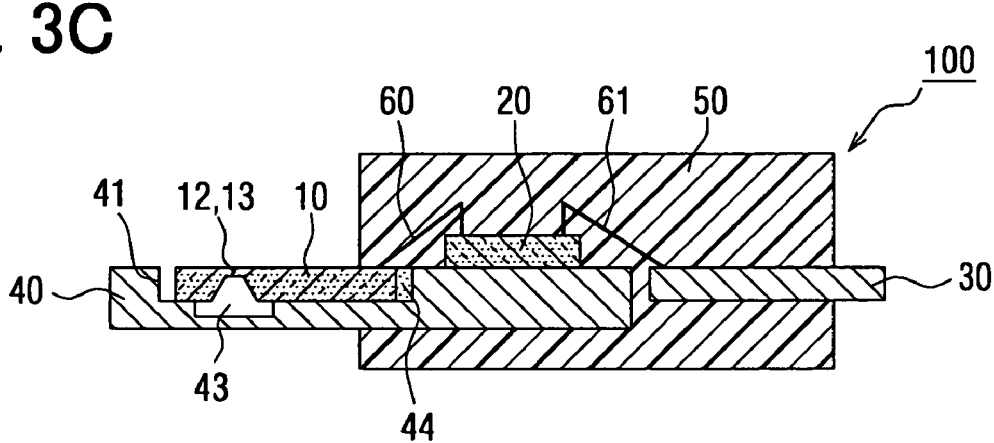

One example of a manufacturing method of the thermal-type flow rate sensor 100 having the above structure will next be described with reference to FIGS. 3A to 3C. FIGS. 3A to 3C are cross-sectional views showing the manufacturing method of the thermal-type flow rate sensor 100. FIG. 3A shows an electric connecting process, FIG. 3B shows a filler injecting process, and FIG. 3C shows a molding process. The groove portion 41 and the communicating groove portion 43 are formed by etching in advance in the support member 40.

First, as shown in FIG. 3A, the flow rate detecting chip 10 is positioned with respect to the groove portion 41 of the support member 40, and is bonded and fixed to the support member 40, for example. At this time, the forming surface of the flow rate detecting portion of the flow rate detecting chip 10 and the surface of the support member 40 become about on the same plane, and the predetermined clearance 42 is formed between the flow rate detecting chip 10 and the side surface of the groove portion 41. Further, the circuit chip 20 having the circuit portion is positioned in an end area of the support member 40, and is bonded and fixed onto the support member 40. The flow rate detecting portion and the circuit portion are electrically connected by the bonding wires 60, and the circuit portion and the leads 30 are electrically connected by the bonding wires 61.

Next, the filler 44 is injected and hardened in an injection area (i.e., the area of the staying portion 45 in FIG. 1A) of the clearance 42. Here, the injection area of the clearance 42 includes a range of the clearance 42, positioned in the covered area of the mold material 50 from the boundary of the mold material 50, and a range of the clearance 42 positioned in the uncovered area of the mold material 50 from the boundary. Furthermore, the injection area is set to not block the communicating portion (the communicating groove portion 43 and the other part of the clearance 42). That is, the clearance 42 is blocked with the filler 44 such that no mold material 50 enters the clearance 42 during the molding process.

After the predetermined range of the clearance 42 is blocked by the filler 44, as shown in FIG. 3C, the mold material 50 is integrally molded by using a predetermined die so as to integrally cover the circuit chip 20, the respective bonding wires 60, 61, and the connecting parts of the bonding wires 60, 61 with the respective parts (i.e., the flow rate detecting chip 10, the circuit chip 20 and the leads 30). Thus, the thermal-type flow rate sensor 100 of this embodiment can reduce noises due to a turbulent flow and can reduce a measuring error due to a temperature change.

The support member 40 and the leads 30 are made of the same material, and are integrated by an unillustrated outer circumferential frame in the above process. After the molding, the thermal-type flow rate sensor 100 is formed by cutting and removing the outer circumferential frame portion.

The injection of the filler 44 into the clearance 42 may be also performed in a state in which the flow rate detecting chip 10 is fixed to the groove portion 41 of the support member 40. That is, the injection of the filler 44 can be also performed before the electric connection using the bonding wires 60, 61 is performed.

(Second Embodiment)

Next, the second embodiment of the present invention will be described with reference to FIGS. 4A, 4B and FIGS. 5A to 5C.

A thermal-type flow rate sensor 100 and its manufacturing method in the second embodiment have common portions to the first embodiment. Accordingly, detailed explanations of the common portions are omitted and different portions will be mainly described.

Figure 4A:
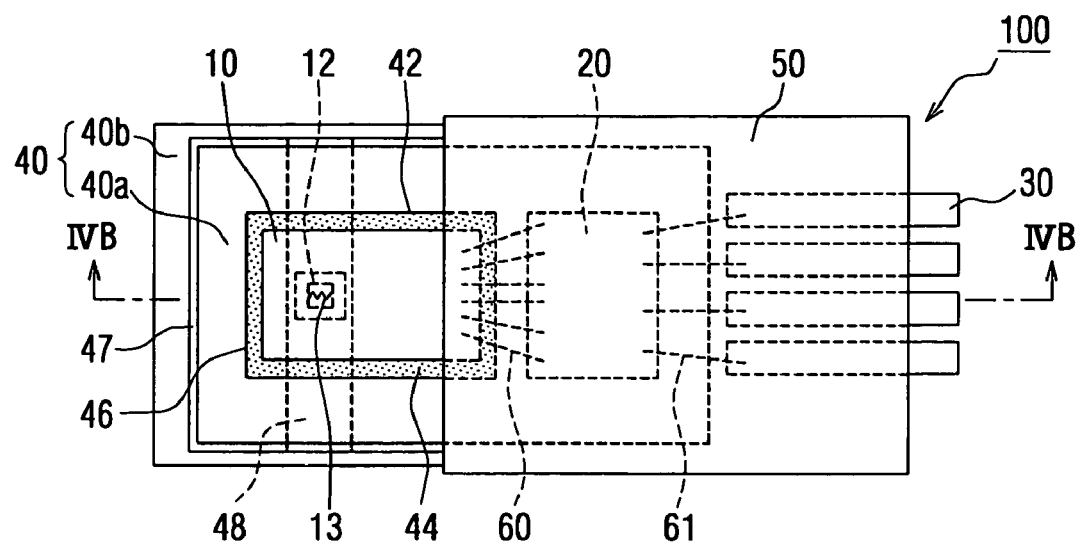
FIG. 4A is a schematic plan view showing a thermal-type flow rate sensor according to a second preferred embodiment of the present invention.
Figure 4B:
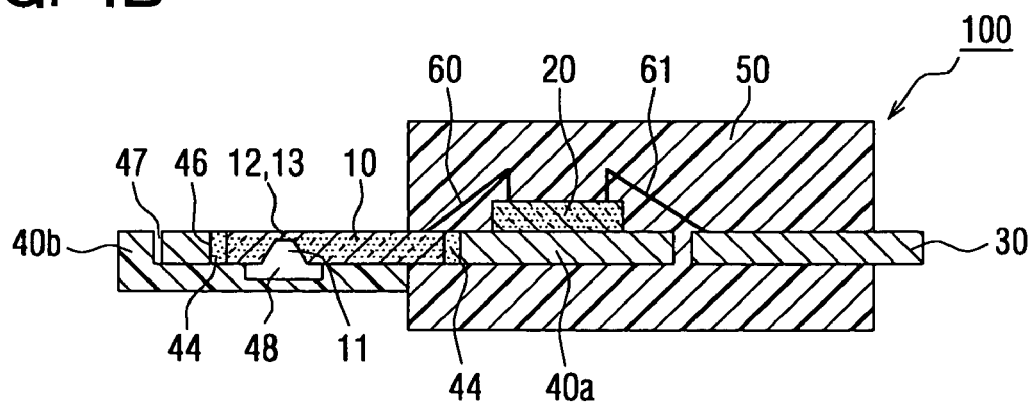
FIG. 4B is a cross-sectional view taken along line IVB—IVB in FIG. 4A.

In the thermal-type flow rate sensor 100 of this embodiment, as shown in FIGS. 4A, 4B, the support member 40 for mounting at least the flow rate detecting chip 10 is constructed with a first support member 40a and a second support member 40b.

For example, the first support member 40a is formed by the same material as leads 30, and a through hole 46 able to arrange the flow rate detecting chip 10 is formed instead of the groove portion 41 in the first embodiment. In this embodiment, the thickness of the first support member 40a is approximately equal to that of the flow rate detecting chip 10, and the size of the through hole 46 is set to about the same as the outer shape of the flow rate detecting chip 10.

For example, the second support member 40b is formed from a resin material such as polyphenylene sulfide (PPS), etc., and the communicating portion is formed. When the first support member 40a is located on the second support member 40b, a groove portion for receiving the flow rate detecting chip 10 is formed by a surface of the second support member 40b and the through hole 46 formed in the first support member 40a. In this embodiment, a communicating groove portion 48 communicating with the clearance 47 between the outside surface of the first support member 40a and the side surface of the second support member 40b opposed to this outside surface is formed as the communicating portion. That is, the communicating portion is constructed with the communicating groove portion 48 and the clearance 47 between the first and second support bodies 40a, 40b. In accordance with such a structure, the structure of the communicating portion can be simplified.

In the second embodiment, the through hole 46 is formed with a predetermined clearance between the first support member 40a and the outer side surface of the flow rate detecting chip 10. Accordingly, when the flow rate detecting chip 10 is arranged within the through hole 46, a predetermined clearance 42 is formed between the side surface of the through hole 46 and the side surface of the flow rate detecting chip 10. The clearance 42 is blocked by injecting a filler 44 while the communicating portion is not blocked. Therefore, it can prevent the mold material 50 from entering into the clearance 42 in the integral molding.

In this embodiment, the communicating portion formed in the second support member 40b is constructed with the communicating groove portion 48, and is formed to be partially communicated with the clearance 42 between the side surface of the through hole 46 and the side surface of the flow rate detecting chip 10. However, the filler 44 is injected into the clearance 42 before the first support member 40a is attached to the second support member 40b. Hence, an adhesive as the filler 44 is injected over the entire circumference of the side surface of the flow rate detecting chip 10 to fix the flow rate detecting chip 10 to the wall surface of the through hole 46 of the first support member 40a. When the adhesive as the filler 44 is injected over the entire circumference of the side surface of the flow rate detecting chip 10 in this way, the connecting strength of the flow rate detecting chip 10 with respect to the through hole 46 of the first support member 40a can be effectively improved.

Thus, the cavity portion 11 of the flow rate detecting chip 10 is not directly exposed to the air as a measured fluid in the thermal-type flow rate sensor 100 of this embodiment. Accordingly, noises due to a turbulent flow of the air can be reduced in comparison with a structure in which no support member 40 (40b) is arranged in the lower portion of the cavity portion 11. Further, the cavity portion 11 of the flow rate detecting chip 10 is not completely blocked by the support member 40 (40a, 40b), and is in a state communicating with the exterior of the flow rate detecting chip 10 by the communicating portion formed in the second support member 40b. Accordingly, the temperature of the fluid within the cavity portion 11 can be changed in accordance with a temperature change around the thermal-type flow rate sensor 100. Hence, a measuring error due to the temperature change can be reduced.

Further, in a state in which the flow rate detecting chip 10 is arranged in the through hole 46 of the first support member 40a, the surface of the flow rate detecting portion of the flow rate detecting chip 10 and the surface of the first support member 40a are positioned about on the same plane. Further, an adhesive such as the filler 44 is injected in the clearance 42 between the side surface of the through hole 46 of the first support member 40a and the side surface of the flow rate detecting chip 10, so that at least one portion of the clearance 42 is blocked to prevent the mold material 50 from entering into the clearance 42 in the molding. Thus, even when the cavity portion 11 is not completely blocked by the support member 40 (40a, 40b) and is in a state communicated with the exterior on the flow rate detecting chip 10 through the communicating portion, the mold material 50 is prevented from entering to the cavity portion 11. Therefore, it can prevent the cavity portion 11 from being blocked by the mold material 50 in the molding.

For example, the thermal-type flow rate sensor 100 of the above structure can be formed by a method described below. The through hole 46 having a size slightly larger than the outer dimension of the flow rate detecting chip 10 is formed in advance in the first support member 40a.

Figure 5A:
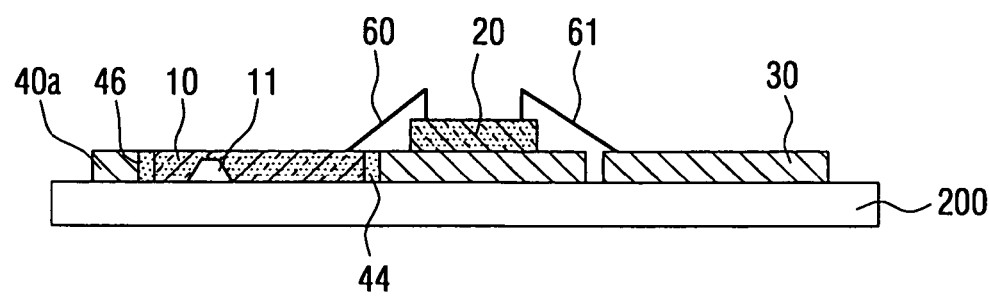
FIGS. 5A to 5C are schematic sectional views showing a filler injection process, a molding process and a groove forming process, respectively, in a manufacturing method of a thermal-type flow rate sensor according to the second embodiment.

First, as shown in FIG. 5A, the first support member 40a and the leads 30 are integrated by an unillustrated outer circumferential frame and are arranged on a base 200. Further, the flow rate detecting chip 10 is arranged in the through hole 46 of the first support member 40a. In this arranging state, the surface of the flow rate detecting portion of the flow rate detecting chip 10 and the surface of the first support member 40a become about on the same plane. An adhesive as the filler 44 is injected and hardened in the clearance 42 between the side surface of the through hole 46 and the side surface of the flow rate detecting chip 10. Here, one end of the through hole 46 is closed by the surface of the base 200. Thus, the flow rate detecting chip 10 is fixed to the first support member 40a through the filler 44, and the clearance 42 is blocked such that no mold material 50 enters the clearance 42 in a molding process described later. The flow rate detecting portion and a circuit portion are electrically connected by the bonding wires 60. Furthermore, the circuit portion and the leads 30 are electrically connected by the bonding wires 61. Then, the base 200 is removed.

Figure 5B:
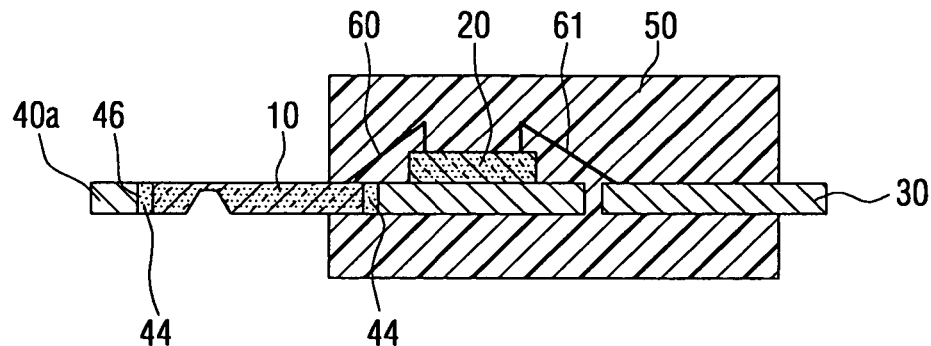
Figure 5C:
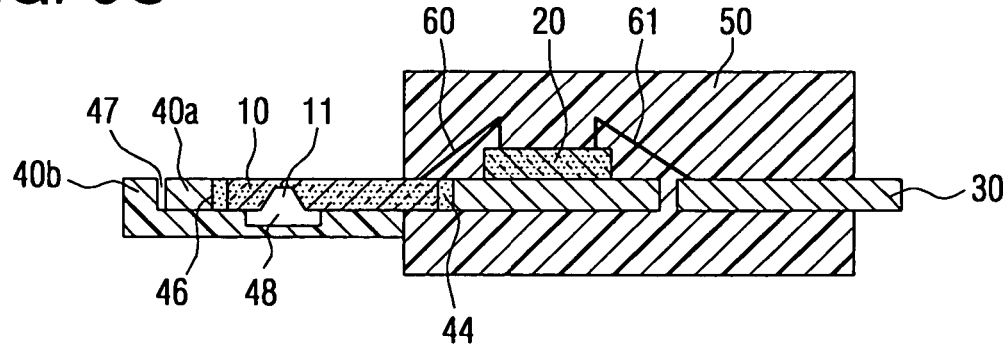

Next, as shown in FIG. 5B, the mold material 50 is integrally molded using a predetermined die, so as to cover the circuit chip 20, the respective bonding wires 60, 61, and connecting parts of the bonding wires 60, 61 connected to respective parts.

Finally, the first support member 40a is fixed to a predetermined position of the second support member 40b by using an adhesive, for example. Thus, in the second embodiment, the groove portion 41 for receiving the flow rate detecting chip 10 is formed by the through hole 46 of the first support member 40a and the surface of the second support member 40b. The cavity portion 11 of the flow rate detecting chip 10 communicates with the exterior on the surface of the flow rate detecting chip 10 through the communicating portion. Here, the communicating portion is constructed with the communicating groove portion 48 formed in the second support member 40b, and the clearance 47 between the outside surface of the first support member 40a and the side surface of the second support member 40b. After the molding process or the groove portion forming process, the thermal-type flow rate sensor 100 is formed by cutting and removing the outer circumferential frame portion.

In the second embodiment, the adhesive as the filler 44 is injected over the entire circumference of the side surface of the flow rate detecting chip 10 as an example, so that the flow rate detecting chip 10 is fixed to the through hole 46 of the first support member 40a. However, the filler 44 made of an adhesive can be partially injected into the clearance 42. For example, the clearance 42 can be partially blocked such that no mold material 50 enters the clearance 42 in the molding process.

According to the second embodiment, the thermal-type flow rate sensor 100 can reduce noises due to a turbulent flow of air (fluid) and can reduce a measuring error due to a temperature change of the air.

(Other Embodiments)

Although the present invention has been described in connection with some preferred embodiments thereof with reference to the accompanying drawings, it is to be noted that various changes and modifications will become apparent to those skilled in the art.

For example, in the above-described embodiments, the substrate for forming the flow rate detecting chip 10 is a semiconductor substrate made of silicon. When the semiconductor substrate is used as the flow rate detecting chip 10, the cavity portion 11 and the thin wall portion 12 can be easily formed in the semiconductor substrate by a general semiconductor manufacturing technique. In this case, the thermal-type flow rate sensor 100 can be manufactured at low cost. However, a glass substrate, etc may be used as the substrate.

Further, in the above-described embodiment, an example in which the support member 40 is formed by one member or two members (i.e., the first support member 40a and the second support member 40b). However, structure of the support member 40 is limited to the above example. For example, the support member 40 can be formed by plural members more that two.

Furthermore, in the above-described embodiments, the circuit chip 20 is arranged on the same support member 40 as the flow rate detecting chip 10. However, the circuit chip 20 can be arranged in a member different from the support member 40 for supporting the flow rate detecting chip 10. In this case, the circuit chip 20 can be made of the same material as the leads 30, and can be integrated with the support member 40a by using the outer circumferential frame.

Furthermore, in the above-described embodiments, the cavity portion 11 may be provided only at one place and may be provided at plural places.

While the invention has been described with reference to preferred embodiments thereof, it is to be understood that the invention is not limited to the preferred embodiments and structures. The invention is intended to cover various modification and equivalent arrangements. In addition, while the various elements of the preferred embodiments are shown in various combinations and configurations, which are preferred, other combinations and configuration, including more, less or only a single element, are also within the spirit and scope of the invention.

What is claimed is:

1. A thermal-type flow rate sensor comprising:
   a flow rate detecting chip including a substrate having a thin wall portion, and a flow rate detecting portion having a heater located in the thin wall portion;
   a circuit chip electrically connected to the flow rate detecting portion through a first connecting wire and having a circuit portion for controlling input and output of the flow rate detecting portion;
   a lead portion electrically connected to the circuit portion through a second connecting wire;
   a support member having a groove portion the flow rate detecting chip being attached in the groove portion at a lower surface of the flow rate detecting chip; and
   a mold material, which is formed through a mold forming, to integrally cover a predetermined range including the circuit chip, connecting parts of the first connecting wire with the flow rate detecting portion and the circuit portion, and connecting parts of the second connecting wire with the circuit portion and the lead portion, so as to expose a part of the flow rate detecting portion including the heater to a measured fluid, wherein:
   the flow rate detecting chip is located in the groove portion of the support member to have a clearance with the groove portion and to form a cavity part inside the thin wall portion;
   the cavity part communicates with an outside of the thin wall portion through a communicating portion that includes the clearance; and
   the clearance is blocked by a filler material, at least at a portion of the filler material being positioned in the predetermined range, the filler material being disposed to prevent the mold material from entering the clearance in the mold forming, the filler material having been flowed into a position located between a side surface of the groove portion and a side surface of the flow rate detecting chip, the filler material flanking an end surface of the flow rate detecting chip.

2. The thermal-type flaw rate sensor according to claim 1, wherein the flow rate detecting chip arranged in the groove portion has a surface that is positioned approximately on the same surface as a surface of the support member.

3. The thermal-type flow rate sensor according to claim 1, wherein the filler material is an adhesive.

4. The thermal-type flow rate sensor according to claim 1, wherein the support member and the lead portion are made of the same material.

5. The thermal-type flow rate sensor according to claim 1, wherein the communicating portion further includes a communication groove that is provided in the support member to communicate with the clearance.

6. The thermal-type flow rate sensor according to claim 5, wherein the communication groove communicates with the clearance between a side wall of the flow rate detecting chip and the groove portion opposite to the side wall.

7. The thermal-type flow rate sensor according to claim 1, wherein a part of the groove portion has a staying portion in which the filler material is provided.

8. The thermal-type flow rate sensor according to claim 1, wherein: the support member includes a first support portion having a through hole in which the flow rate detecting chip is arranged, and a second support portion for supporting the first support portion.

9. The thermal-type flow rate sensor according to claim 8, wherein:
   the second support portion bas a communication groove used as the communicating portion; and the communication groove communicates with a clearance between an outer side surface of the first support portion and a side surface of the second support portion, opposite to the outer side surface of the first support portion.

10. The thermal-type flow rate sensor according to claim 1, wherein the substrate is a semiconductor substrate.

11. The thermal-type flow rate sensor according to claim 1, wherein the cavity part is a recess in the lower surface of the flow rate detecting chip, the flow rate detecting chip being attached to the support member at the lower surface of the flow rate detecting chip, the lower surface facing the support member.

12. The thermal-type flow rate sensor according to claim 1, wherein the filler material is arranged at least at a first portion and a second portion in the clearance between the side surface of the groove portion and the side surface of the flow rate detecting chip, the first portion being positioned between the flow rate detecting chip and the circuit chip, the second portion being adjacent to the first portion.

* * * * *